E. Quincy,
Corn Harvester.
No. 7705.                 Patented. Oct. 8, 1850.
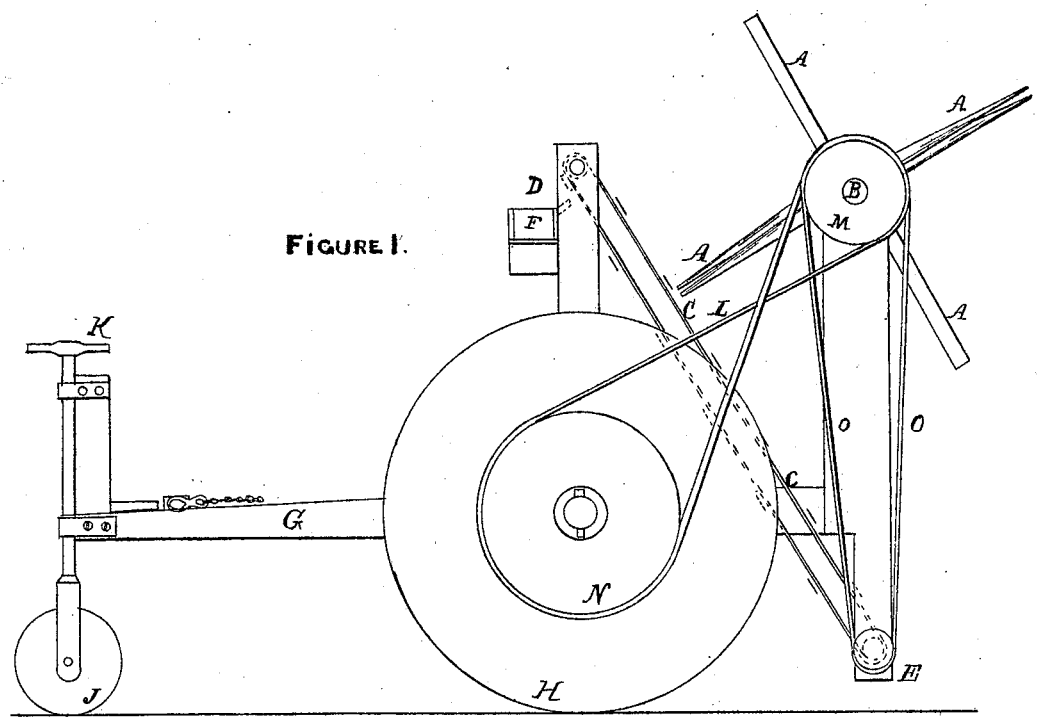
FIGURE 1.
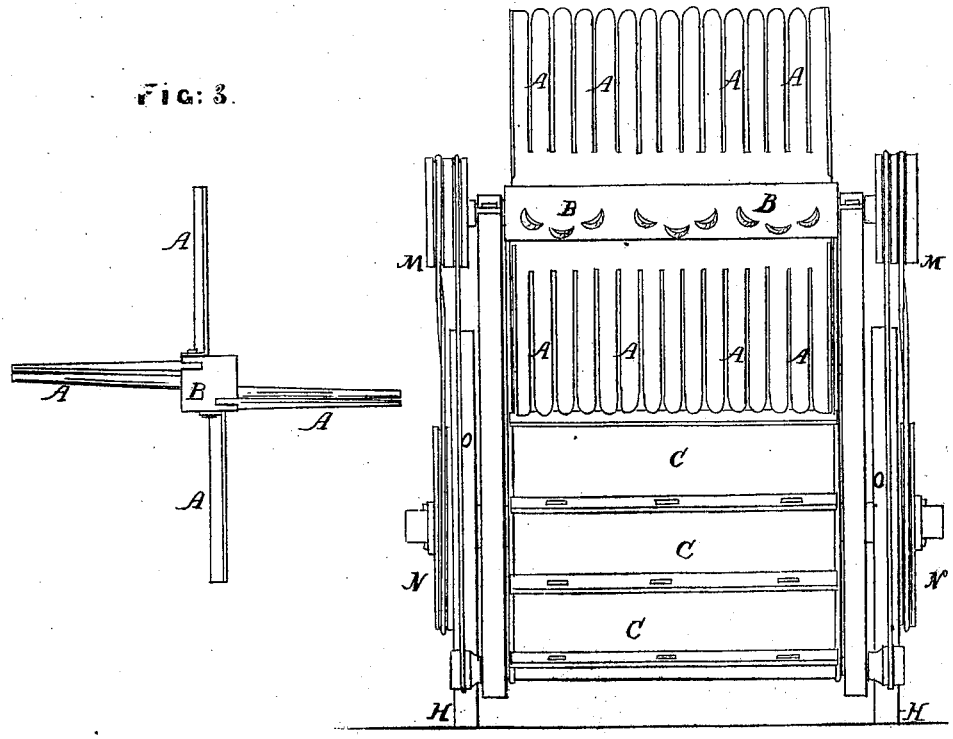
Fig: 3.          Fig: 2

UNITED STATES PATENT OFFICE.

E. QUINCY, OF LACON, ILLINOIS.

GRAIN AND MAIZE HARVESTER.

Specification forming part of Letters Patent 7,705, dated October 8, 1850.

*To all whom it may concern:*

Be it known that I, EDMUND QUINCY, of the town of Lacon, county of Marshall, in the State of Illinois, have invented a new and useful machine, entitled the "Eureka Harvester," for the purpose of gathering the heads of wheat, the ears of Indian corn, and other grain and seeds; and I do hereby declare that the following is a full, clear, and exact description of the construction and operation of the same, reference being had to the accompanying drawings, and to the letters of reference marked thereon, the same letters referring to the same parts in the different figures, and making a part of this specification.

Figure 1 is an elevation of the side of the machine. Fig. 2 is an elevation of the front of the machine. Fig. 3 is a transverse section of the rotating shaft and fingers or knives.

The nature of my invention consists in a set of metallic fingers or knives, A, (concave, flat, or fluted, and may be straight or curved in the direction of their motion,) arranged radially upon a revolving shaft, B, in such a manner or distance apart as to allow the straw, stems, or stalks of grain to pass between them until the heads, ears, or seed coming in contact with the fingers are cut off by them and thrown into the elevators C, which also revolve as the shafts D E, and are carried by the elevators into an inclined spout, F, from which it falls into a wagon by the side of the machine, or other proper receptacle. The fingers, as well as being adjustable at pleasure to any desired distance apart, may be made of any desirable length or width.

This machine is easily adapted to the gathering of the various seeds and grain, it being only necessary to alter the distance of the fingers to adapt it to the use intended.

The machine is moved by horses attached to a tongue, G, and two wheels, H, which are before the horses. A steering-wheel, J, is behind the horses at the end of the tongue, where is a platform for the driver, who drives the horses and guides the machine by means of a rudder, K. The shaft B is turned by bands L passing over a small pulley, M, placed upon each end of the shaft, and another pulley, N, placed upon the outside of each driving-wheel, which last pulley may be about two-thirds the size of the driving-wheels to which they are attached. These bands are crossed to give an opposite motion to the shaft from that of the driving-wheels. The elevators are kept in motion by bands O passing from the pulley on the end of the shaft B to a roller fixed in the lower part of the frame which supports the shaft.

Having thus fully set forth the nature and principles of my invention, what I claim as my invention, and desire to secure by Letters Patent, is—

The use of the revolving shaft B, in combination with a system of fingers, teeth, or knives arranged on the shaft, as described, and for the purpose herein set forth, not confining myself to any particular size, shape, or curvature.

EDMUND QUINCY.

Witnesses:
J. J. GRINDALL,
C. H. WOOD.